United States Patent
Bidner et al.

(10) Patent No.: US 10,173,674 B2
(45) Date of Patent: Jan. 8, 2019

(54) TRACTION BASED SYSTEMS AND METHODS

(71) Applicant: Ford Global Technologies, LLC, Dearborn, MI (US)

(72) Inventors: David Karl Bidner, Livonia, MI (US); Timothy Joseph Clark, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 175 days.

(21) Appl. No.: 15/183,355

(22) Filed: Jun. 15, 2016

(65) Prior Publication Data

US 2017/0361839 A1 Dec. 21, 2017

(51) Int. Cl.
*B60W 30/095* (2012.01)
*B60Q 1/46* (2006.01)
*B60W 40/068* (2012.01)

(52) U.S. Cl.
CPC .......... *B60W 30/0953* (2013.01); *B60Q 1/46* (2013.01); *B60W 40/068* (2013.01); *B60W 2530/20* (2013.01)

(58) Field of Classification Search
CPC .......... B60W 30/0953; B60W 40/068; B60W 2530/20; B60W 2520/125; B60T 8/175; B60T 8/172; B60T 8/1755; B60T 8/1763; G08G 1/096758; G08G 1/096791; G08G 1/161; G08G 1/096716; B60G 2400/102; B60G 2400/204; B60R 21/013; B61D 3/18; B62D 1/28; B60P 3/08; G01S 13/931; G01S 2013/9325; B60Q 1/46
See application file for complete search history.

(56) References Cited

U.S. PATENT DOCUMENTS

| 3,760,353 | A | 9/1973 | Hassinger |
| 4,876,525 | A | 10/1989 | Gross |
| 5,275,474 | A | 1/1994 | Chin et al. |
| 5,351,779 | A | 10/1994 | Yamashita |
| 6,533,367 | B1 | 3/2003 | Latarnik et al. |
| 6,574,538 | B2 | 6/2003 | Sasaki |

(Continued)

FOREIGN PATENT DOCUMENTS

| CN | 102126463 A | 7/2011 |
| KR | 20130033730 A | 4/2013 |

(Continued)

OTHER PUBLICATIONS

Kermit Whitfield, "A hitchhiker's guide to the telematics ecosystem", Automotive Design & Production, Oct. 2003, http://findarticles.com, pp. 1-3.

(Continued)

*Primary Examiner* — Rachid Bendidi
(74) *Attorney, Agent, or Firm* — James P. Muraff; Neal, Gerber & Eisenberg LLP (57) ABSTRACT

A first vehicle includes: steering, brakes, memory, sensors, and processor(s) configured to: determine, with the sensors: the first vehicle's acceleration, a second vehicle's acceleration; compute a theoretical collision velocity (TCV) between the first vehicle and the second vehicle based on the accelerations; apply a function or generate a command based on the TCV and a selected coefficient of kinetic friction (COF).

17 Claims, 5 Drawing Sheets

(56) References Cited

U.S. PATENT DOCUMENTS

| | | | |
|---|---|---|---|
| 6,721,632 B2 | 4/2004 | Fallenstein | |
| 6,791,471 B2 | 9/2004 | Wehner et al. | |
| 6,829,529 B2 | 12/2004 | Trefzer et al. | |
| 6,866,349 B2 | 3/2005 | Sauter et al. | |
| 7,113,107 B2 | 9/2006 | Taylor | |
| 7,167,799 B1 | 1/2007 | Dolgov et al. | |
| 7,486,199 B2 | 2/2009 | Tengler et al. | |
| 7,583,372 B2 | 9/2009 | Shylanski et al. | |
| 7,643,915 B2 | 1/2010 | Jackson et al. | |
| 7,920,969 B2 | 4/2011 | Mudalige et al. | |
| 8,036,788 B2 | 10/2011 | Breed | |
| 8,180,547 B2 | 5/2012 | Prasad et al. | |
| 8,706,347 B2 | 4/2014 | Bae et al. | |
| 8,844,147 B2 | 9/2014 | Wilds et al. | |
| 2002/0198660 A1 | 12/2002 | Lutter et al. | |
| 2004/0254729 A1 | 12/2004 | Browne et al. | |
| 2005/0096825 A1 | 5/2005 | Lee | |
| 2007/0188348 A1 | 8/2007 | Bauer et al. | |
| 2010/0019932 A1 | 1/2010 | Goodwin | |
| 2010/0245123 A1* | 9/2010 | Prasad | B60T 8/175 340/870.41 |
| 2013/0124064 A1* | 5/2013 | Nemoto | B60K 31/0058 701/96 |
| 2014/0046566 A1* | 2/2014 | Maitlen | B60T 8/1701 701/70 |
| 2014/0302774 A1 | 10/2014 | Burke et al. | |
| 2015/0298553 A1* | 10/2015 | Maiterth | B60L 3/10 701/71 |
| 2016/0018209 A1 | 1/2016 | Nagornov | |

FOREIGN PATENT DOCUMENTS

| | | |
|---|---|---|
| KR | 20170018697 A | 2/2017 |
| WO | 2010107344 A1 | 9/2010 |

OTHER PUBLICATIONS

Ford Motor Company, "Navigation System: SYNC," Owner's Guide Supplement, SYNC Version 1 (Jul. 2007).

Ford Motor Company, "SYNC," Owner's Guide Supplement, SYNC Version 1 (Nov. 2007).

Ford Motor Company, "Navigation System: SYNC," Owner's Guide Supplement, SYNC Version 2 (Oct. 2008).

Ford Motor Company, "SYNC," Owner's Guide Supplement, SYNC Version 2 (Oct. 2008).

Unpublished pending U.S. Appl. No. 14/991,496 filed Jan. 8, 2016.

Search Report dated Dec. 4, 2017, for GB Patent Application No. GB1709338.6 (3 pages).

Real-Time Vehicle Wheel & Axle Dynamic Alignment Monitoring, <http://axletrak.com/>.

* cited by examiner

TRACTION BASED SYSTEMS AND METHODS

TECHNICAL FIELD

This disclosure relates to vehicle kinematics and preventing vehicle collisions by accounting for coefficient of kinetic friction.

BACKGROUND

U.S. Pat. No. 8,180,547 discloses a system and method for detecting a slip condition between a vehicle tire and a road surface, processing contemporaneous vehicle data, such as torque or brake pressure applied, to determine a force of friction, and calculating a coefficient of friction. The coefficient of friction and location of the slip are broadcast to other vehicles driving in the proximity of the slip. The broadcasts may be utilized to notify drivers of slippery driving conditions at or ahead of the vehicle, and/or to limit torque and braking pressure applied to vehicle wheels to enhance traction and avoid slip.

U.S. Pat. No. 6,866,349 discloses a vehicle traction control system having capabilities for braking intervention and coefficient of friction detection. In order to improve the lateral stability of the vehicle when cornering on road surfaces having a low coefficient of friction, the slip threshold for the drive wheel on the outside of the curve is reduced independently of that of the drive wheel on the inside of the curve and is set to a lower value than that for the wheel on the inside of the curve.

U.S. Pat. No. 6,791,471 discloses a system for wireless communication between vehicles that permits position information about one vehicle to be communicated directly to another vehicle. Such an information exchange between vehicles may increase the awareness of an operator of a vehicle to other vehicles in the surrounding environment. Vehicles may share through the use of wireless communications position, direction, speed, or other information, such as the deployment of safety devices. The vehicle that receives a wireless communication compares the position, direction, and speed of incoming information from another vehicle to the vehicle's own speed, direction, and position to determine whether action is required. The action taken by the vehicle may include providing general or specific warnings to the operator of the vehicle or, in some cases, taking direct action, such as turning off cruise control, applying brakes, or deploying traction control.

SUMMARY

One embodiment of the present invention relates to a first vehicle with: steering, brakes, memory, sensors, and processor(s) configured to: determine, with the sensors: the first vehicle's acceleration, a second vehicle's acceleration; compute a theoretical collision velocity (TCV) between the first vehicle and the second vehicle based on the accelerations; apply a function or generate a command based on the TCV and a selected coefficient of kinetic friction (COF).

One embodiment of the present invention relates to a first vehicle with: steering, brakes, memory, sensors, and processor(s) configured to: determine, with the sensors: the first vehicle's acceleration, a second vehicle's acceleration; compute a theoretical collision velocity (TCV) between the first vehicle and the second vehicle based on the accelerations; apply a function or generate a command based on the TCV.

One embodiment of the present invention relates to a method of controlling a first vehicle that has steering, brakes, memory, and processor(s), the method including, with the processors: determining, with the sensors: the first vehicle's acceleration, a second vehicle's acceleration; computing a theoretical collision velocity (TCV) between the first vehicle and the second vehicle based on the accelerations; applying a function or generating a command based on the TCV and a selected coefficient of kinetic friction (COF).

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present, as one option, and mutually exclusive alternatives as another option. In other words, the conjunction "or" should be understood to include "and/or" as one option and "either/or" as another option.

Figure 1:
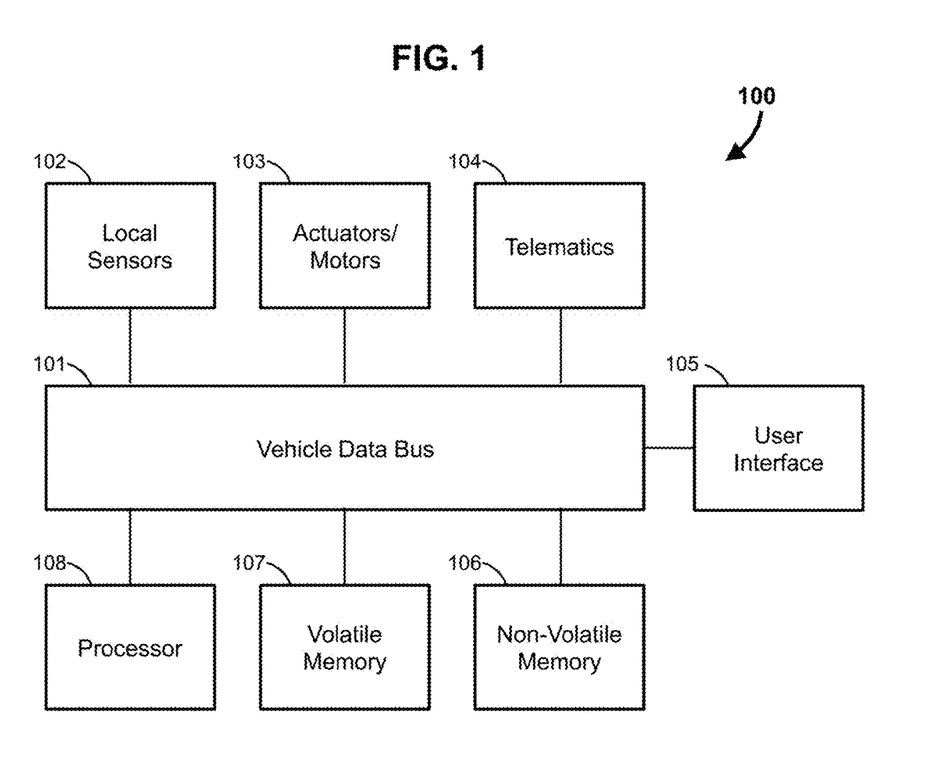
FIG. 1 is a block diagram of a vehicle computing system.

FIG. 1 shows a computing system 100 of an example vehicle 200. The vehicle 200 is also referred to as a first vehicle 200. The vehicle 200 includes a motor, a battery, at least one wheel driven by the motor, and a steering system configured to turn the at least one wheel about an axis. Suitable vehicles are also described, for example, in U.S. patent application Ser. No. 14/991,496 to Miller et al. ("Miller") and U.S. Pat. No. 8,180,547 to Prasad et al. ("Prasad"), both of which are hereby incorporated by reference in their entirety. The computing system 100 enables automatic control of mechanical systems within the device. It also enables communication with external devices. The computing system 100 includes a data bus 101, one or more processors 108, volatile memory 107, non-volatile memory 106, user interfaces 105, a telematics unit 104, actuators and motors 103, and local sensors 102.

The data bus 101 traffics electronic signals or data between the electronic components. The processor 108 performs operations on the electronic signals or data to produce modified electronic signals or data. The volatile memory 107 stores data for immediate recall by the processor 108. The non-volatile memory 106 stores data for recall to the volatile memory 107 and/or the processor 108. The non-volatile memory 106 includes a range of non-volatile memories including hard drives, SSDs, DVDs, Blu-Rays, etc. The user interface 105 includes displays, touch-screen displays, keyboards, buttons, and other devices that enable user interaction with the computing system. The telematics unit 104 enables both wired and wireless communication with external processors via Bluetooth, cellular data (e.g., 3G, LTE), USB, etc. The telematics unit 104 may be configured to broadcast signals at a certain frequency (e.g., one type of vehicle to vehicle transmission at 1 kHz or 200 kHz, depending on calculations described below). The actuators/motors 103 produce physical results. Examples of actuators/motors include fuel injectors, windshield wipers, brake light circuits, transmissions, airbags, haptic motors or engines etc. The local sensors 102 transmit digital readings or measurements to the processor 108. Examples of suitable sensors include temperature sensors, rotation sensors, seatbelt sensors, speed sensors, cameras, lidar sensors, radar sensors, etc. It should be appreciated that the various connected components of FIG. 1 may include separate or dedicated processors and memory. Further detail of the structure and operations of the computing system 100 is described, for example, in Miller and/or Prasad.

Figure 2:
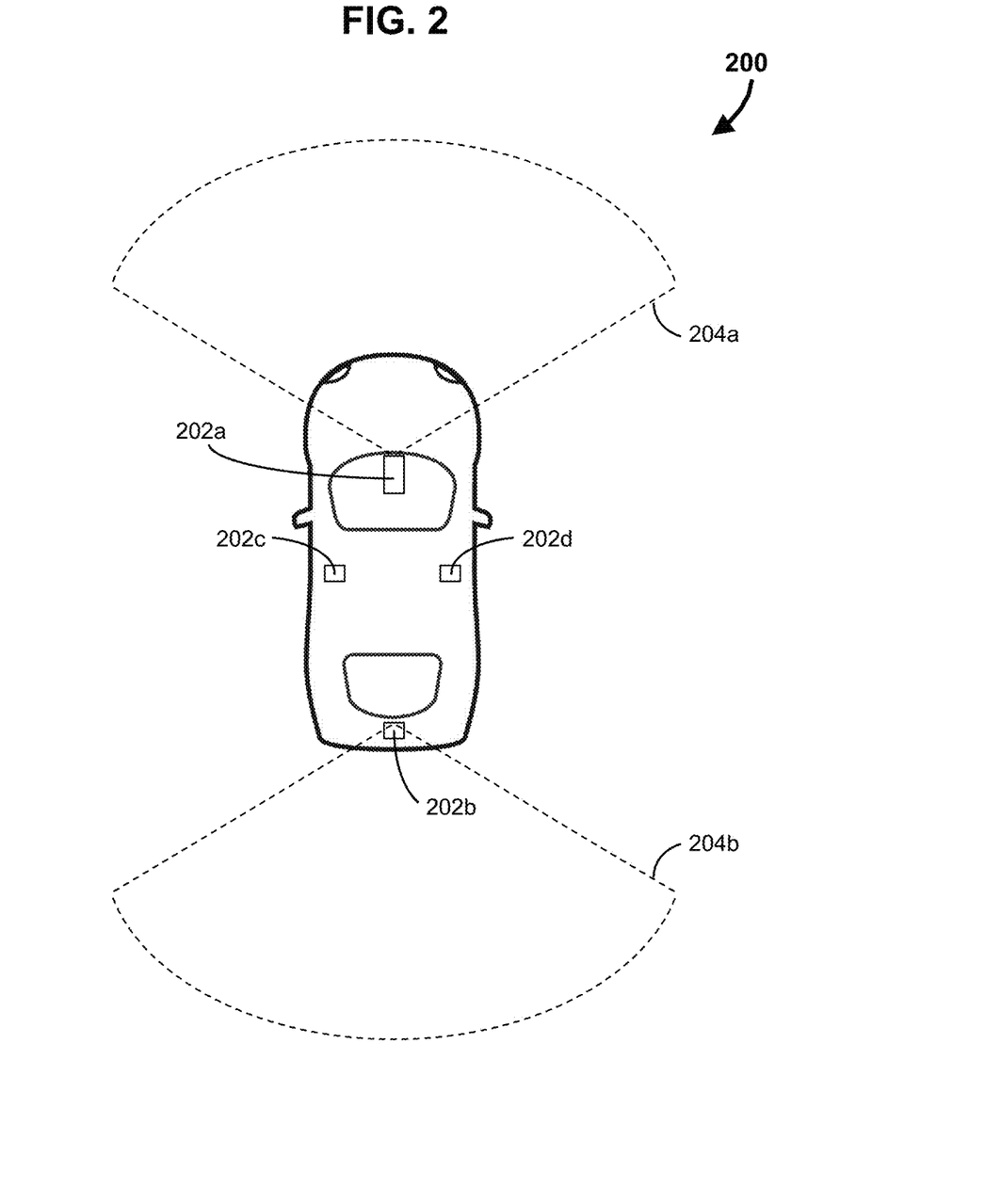
FIG. 2 is a schematic of a vehicle including the vehicle computing system.

FIG. 2 generally shows and illustrates the vehicle 200 including the computing system. Although not shown, the vehicle 200 is in operative wireless communication with a nomadic device, such as a mobile phone. The vehicle 200 includes sensors 202 mounted on the exterior of the vehicle 200. Sensor 202a may be an ultrasonic sensor and/or a lidar sensor configured to detect objects leading the vehicle 200 as indicated by leading sensing range 204a. Sensor 202b may be an ultrasonic sensor and/or a lidar sensor configured to detect objects trailing the vehicle 200 as indicated by trailing sensing range 204b. Left sensor 202c and right sensor 202d may be configured to perform the same functions for the left and right sides of the vehicle 200s. The vehicle 200 includes a range of other sensors 202 located in the vehicle 200 interior or the vehicle 200 exterior. These sensors include any or all of the sensors disclosed in Prasad. In particular, the vehicle 200 includes sensors configured to measure a coefficient of kinetic friction between a slipping vehicle 200 wheel/tire and a surface of a road.

It should be appreciated that the vehicle 200 is configured to perform the methods and operations described below. In some cases, the vehicle 200 is configured to perform these functions via computer programs stored on the various volatile or non-volatile memories of the computing system 100. In other words, a processor is configured to perform a disclosed operation when it is in operative communication with memory storing a software program with code or instructions embodying the disclosed operation. Further description of how the processor, memories, and programs cooperate appears in Prasad. It should further be appreciated that a nomadic device (described below) in operative communication with the vehicle 200 may alternatively or in addition perform some or all of the methods and operations discussed below by querying the sensors of the vehicle 200.

In various embodiments, the vehicle 200 is the vehicle 200 100a of Prasad. In various embodiments, the computing system 100 is the VCCS 102 of FIG. 2 of Prasad. In various embodiments, the vehicle 200 is in communication with some or all of the devices shown in FIG. 1 of Prasad, including the nomadic device 110, the communication tower 116, the telecom network 118, the Internet 120, and the data processing center 122. As stated above, the vehicle 200 and/or the nomadic device (not shown) of the present disclosure are configured (via programming stored on memories linked with processors) to perform some or all of the functions disclosed in Prasad. More specifically, the vehicle 200 and the nomadic device are configured to perform the methods disclosed in FIGS. 3 to 7 of Prasad and any other methods disclosed in the Prasad specification. It should thus be appreciated that methods disclosed to be performed on the vehicle 200 may be alternatively, or in addition, performed on the nomadic device.

Consistent with the disclosure of Prasad, the vehicle 200 of the present disclosure is configured to calculate the coefficient of kinetic friction, $\mu_k$, between a vehicle 200 wheel and a surface of a road as disclosed, for example, in columns 4 and 8 of Prasad. This specification refers to the coefficient of kinetic friction as both "$\mu_k$" and "COF." The vehicle 200 of the present disclosure is configured to calculate $\mu_k$ for each of the vehicle 200 wheels and is configured to store the calculated $\mu_k$ in the vehicle 200 memory. Additionally, the vehicle 200 of the present disclosure is configured to determine a location of the recorded coefficient of friction, as disclosed in columns 8 and 9 of Prasad. The vehicle 200 is configured to associate a present location with each calculated $\mu_k$. In some embodiments, and as disclosed in Prasad, the vehicle assumes that the road has a predetermined $\mu_k$ unless and until the vehicle detects wheel slip.

Figure 4:
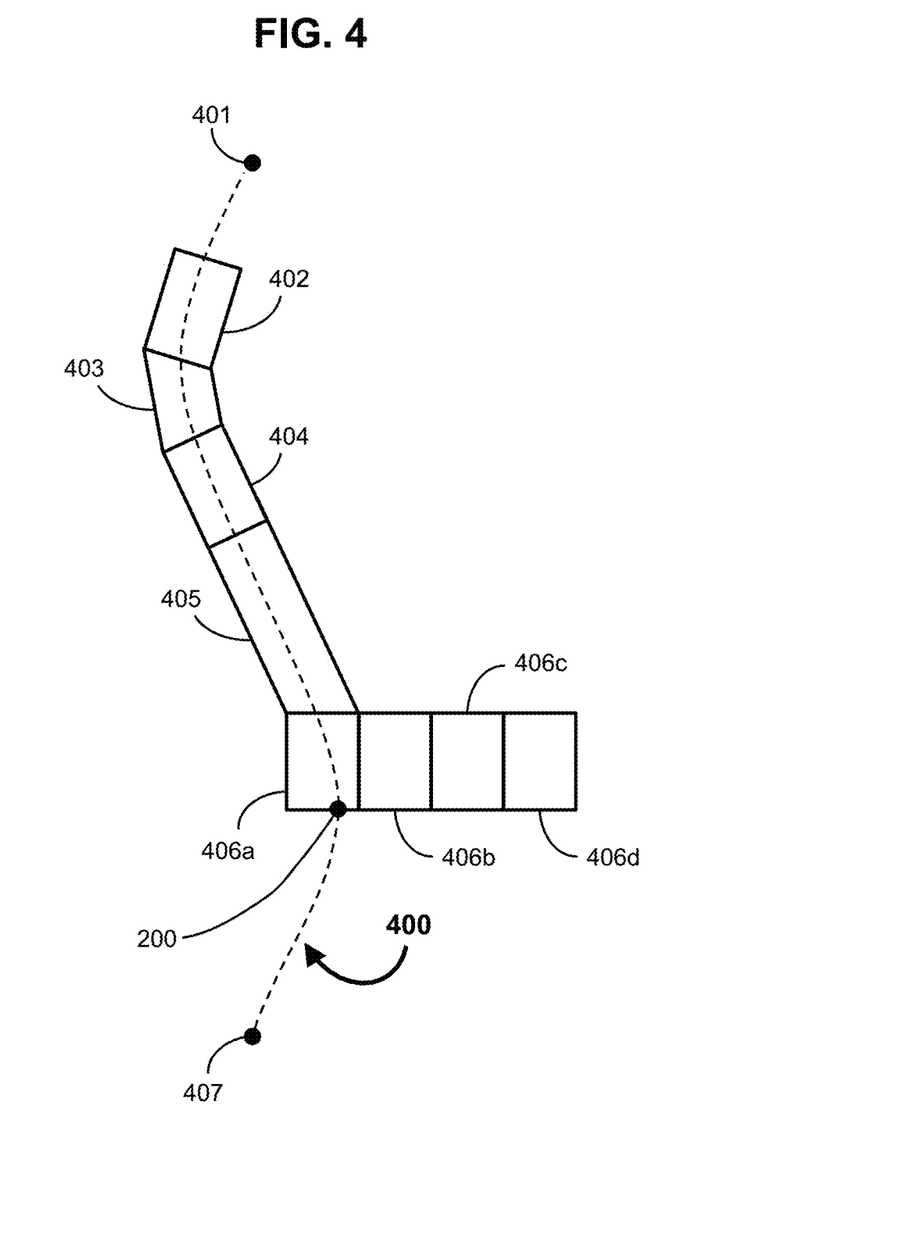
FIG. 4 illustrates collection of friction data along a segment of road.

FIG. 4 generally shows and illustrates the vehicle 200 measuring and recording $\mu_k$ along a route 400. The vehicle 200 begins at a starting point 401, then traverses the route 400 to ending point 407. As the vehicle 200 traverses the route 400, the vehicle 200 measures and records $\mu_k$. To conserve data, the vehicle 200 divides the routes into various segments 402 to 406, and then records a single $\mu_k$ for each segment. For example, segment 402 has a first $\mu_k$, segment 403 has a second $\mu_k$, etc.

Each segment has a length. A segment length corresponds to the length of road associated with the segment. As shown in FIG. 4, segment 403 has a short length, segment 404 has a medium length, and segment 405 has a long length. Each segment (no matter its length) generally requires the same amount of memory for storage devoted to length. More specifically, the memory stores two or more of a location of a beginning of the segment, a total length of the segment, and a location of an end of the segment. For example, the length of segment 403 could be stored in the example matrix of [begin at X, end at Y]. It should thus be appreciated that as the vehicle 200 divides the route 400 into more segments, the vehicle 200 must devote a greater amount of memory to storing the route 400. Conversely, as the vehicle 200 increases the lengths of segments, the vehicle 200 devotes a smaller amount of memory to storing the route 400. For example, a single segment extending from starting point 401 to ending point 407 would take up a first amount of memory. If, however, route 400 was broken up into a plurality of segments (as shown in FIG. 4), then information associated with the route would take up a second, larger amount of memory.

The vehicle 200 is thus configured to segment lengths of a route, such as the lengths of route 400, with various software algorithms. The various software algorithms are explained in detail below. It should be appreciated that these software algorithms are examples and that other software algorithms may be applied.

A first algorithm divides the route 400 into segments by comparing new measurements to an average of previous measurements. More specifically, the first algorithm compares a newly measured $\mu_k$ with a running average $\mu_k$ of the current segment. If the newly measured $\mu_k$ matches the running average $\mu_k$ of the current segment within certain predetermined limits, then the first algorithm combines the running average with the newly measured $\mu_k$ and extends the current segment to encompass the location associated with the newly measured $\mu_k$. The combining may comprise weighting the running average $\mu_k$ according to the number of measurements previously combined into the running average $\mu_k$. For example, if the running average $\mu_k$ was the average of ten discrete $\mu_k$, then the running average may be weighted as ten, and the newly measured $\mu_k$ may be weighted as one as shown in the following formula: $\mu_{k\ new\ running\ average} = (X * \mu_{k\ previous\ running\ average} + 1 * \mu_{k\ newly\ measured}) / (X+1)$, wherein X is the number of discrete measurements combined to form the previous running average, $\mu_{k\ previous\ running\ average}$.

The certain predetermined limits may be predetermined percentages above and below the running average. More specifically, the upper limit may be 5% above the running average and the lower limit may be 5% below the running average. When a newly measured $\mu_k$ falls between the upper limit and the lower limit, the segment is extended and the newly measured $\mu_k$ is integrated into the running average to form a new running average as described above. When the newly measured $\mu_k$ falls outside of the limits (i.e., is above the upper limit or below the lower limit), then the vehicle 200 ends the current segment, saves the current segment, and begins a new segment with a running average= $\mu_{k\ newly\ measured}$. Alternatively, the upper and lower limits may be a predetermined percentage of the first discrete measurement of a segment instead of a predetermined percentage of a running average of a segment. This would result in accurate measurements of $\mu_k$ when $\mu_k$ of a road slowly increases or slowly decreases.

A second algorithm divides the route 400 into segments by comparing new measurements of $\mu_k$ to predetermined ranges. A first range could include all $\mu_k$ from 0 to 0.1 (inclusive). A second range could include all $\mu_k$ above 0.1 to 0.2 (inclusive). A third range could include all $\mu_k$ above 0.2 to 0.3 (inclusive) etc. In this case, the vehicle 200 would begin a new segment when a newly measured $\mu_k$ fell into a new range (i.e., a range different from the current range).

With reference to FIG. 4, segment 402 could be the first range, segment 403 could be the third range, and segment 404 could be the second range. Under this algorithm, the vehicle 200 could associate a representative single representative $\mu_k$ with a segment in at least three ways: first, by averaging all $\mu_k$ recorded inside the segment; second, by automatically finding an average of the range boundaries associated with the segment and then labeling the segment with a representative $\mu_k$ irrespective of the actual recorded $\mu_k$ (e.g., every second range would be assigned a representative $\mu_k$ of 0.15=the average of 0.1 and 0.2, no matter what $\mu_k$ were actually recorded in the segment); third, by automatically assigning a segment with a $\mu_k$ equal to the lowest $\mu_k$ measured in the segment (e.g., if segment 404 included $\mu_k$ measurements of 0.11, 0.16, and 0.18, then the vehicle 200 would mark segment 404 has having a representative $\mu_k$ of 0.11).

A third algorithm divides the route 400 into segments based on braking events. In other words, each segment is either associated with (a) a coasting or acceleration event, or (b) a braking event. A new segment begins when the vehicle 200 transitions from (a) to (b) or from (b) to (a).

It should be appreciated that the above algorithms contemplate finding $\mu_k$ when the vehicle is stable (i.e., not slipping) and when the vehicle is slipping. In some embodiments, as disclosed in Prasad, the vehicle only calculates $\mu_k$ with reference to vehicle torque when the vehicle is slipping. In these embodiments, the vehicle may find $\mu_k$ while stable (i.e., not slipping) by detecting a type of road surface and pairing the detected road surface with a measured or received ambient condition (e.g., rain). Prasad, for example, discloses that $\mu_k$ between rubber and dry concrete is 0.6 to 0.85, whereas $\mu_k$ between rubber and wet concrete is 0.45 to 0.75. In other embodiments, the vehicle continuously calculates $\mu_k$ with reference to vehicle torque (or other known methods that integrate results of local vehicle sensors besides ambient condition sensors), no matter whether the vehicle is stable or slipping.

In addition to length, each segment has a width. The width of a segment is associated with the quantity of information associated with the segment. For example, some segments are associated with a single $\mu_k$ representing the coefficient of friction of the route 400 in the segment. Other segments, however, may include multiple $\mu_k$, each representing the coefficient of friction of a single vehicle tire.

Referring to FIG. 4, segments 402 to 405 have equal widths. Segment 406 includes widths 406a, 406b, 406c, and 406d. Segment 406 thus includes a $\mu_k$ for each of the tires of the vehicle 200 and includes more detailed information than segments 402 to 405. In various embodiments, segment 406 is comprised of two widths 406a and 406b, representing the left side of the route 400 and the right side of the route 400.

It should be appreciated that the vehicle 200 may execute any of the above disclosed algorithms for each of the widths. In other words, segments 402 to 405 may represent $\mu_k$ of only the right side of the route 400. In this case, the vehicle 200 would simultaneously map and segment $\mu_k$ for the left side of the vehicle 200 with different segments (not shown). The segment lengths for the left side of the route 400 and the right side of the route 400 could differ, and could separately depend on the above-described algorithms. For example, the vehicle 200 might record a constant $\mu_k$ for the right side of the route 400. In this case, the right side of the route 400 would produce a single segment extending from 401 to 407. Simultaneously, the vehicle 200 would record a varying $\mu_k$ for the left side of the vehicle 200. In this case, the left side of the route 400 would produce multiple segments extending from 401 to 407.

In various embodiments, the vehicle 200 records and stores segments of maximum width, such as segment 406, but selects a width for transmission (via vehicle-to-vehicle technologies or via the Internet) based on a detected wireless connection speed. For example, if the vehicle 200 detects a high wireless connection speed, then the vehicle 200 may transmit all widths of a recorded segment. If, however, the vehicle 200 detects a low wireless connection speed, then the vehicle 200 may transmit a single width for a recorded segment.

The vehicle 200 may apply various algorithms to select width(s) for transmission. In one embodiment, the vehicle 200 transmits the width having the lowest $\mu_k$ and marks the transmitted $\mu_k$ as being representative of the complete segment. When the vehicle 200 transmits less than the full amount of widths or a representative width (e.g., only width 406a), the vehicle 200 marks the transmission as being partial. When the vehicle 200 transmits the full amount of widths, then the vehicle 200 marks the transmission as being complete. In various embodiments, the vehicle 200 transmits at least one representative width for stored but un-transmitted segments at a predetermined frequency (e.g., 10 Hz).

Figure 3:
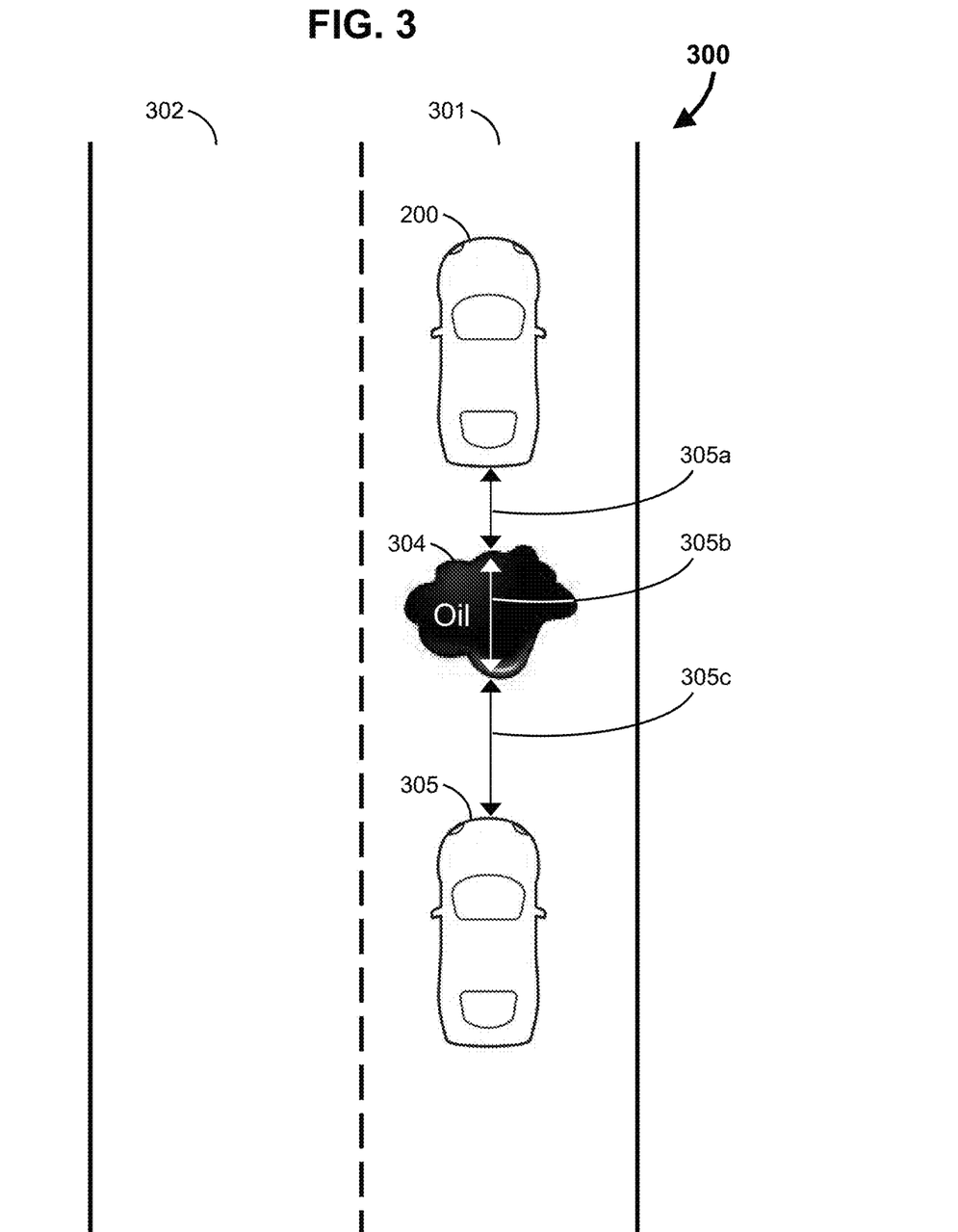
FIG. 3 is an example use-case for the present invention.

FIG. 3 generally shows and illustrates an example use case for applying measured $\mu_k$. FIG. 3 shows a road 300 with lanes 301 and 302. The vehicle 200 (i.e., the first vehicle 200) is leading an external vehicle 305 (i.e., the second vehicle 305) in the right lane 301. An oil slick 304 lies in the right lane 301. The oil slick 304 lowers the coefficient of kinetic friction, $\mu_k$, between a vehicle, such as vehicles 200 and 305, and the road 300. Thus, with reference to FIG. 3, the coefficient of kinetic friction of segment 305a would be high, the coefficient of kinetic friction of segment 305b would be low, and the coefficient of kinetic friction of segment 305c would be high. These individual segments 305a to 305c may have been generated according to the methods associated with FIG. 4. Although FIG. 3 shows an oil slick 304, it should be appreciated that the oil slick 304 may represent any condition imparting low dynamic friction, such as a puddle of liquid water, ice, or grains of sand.

The first vehicle 200 has a first acceleration, $a_1$, first velocity, $v_1$, and first position, $p_1$. The second vehicle 305 has a second acceleration, $a_2$, second velocity, $v_2$, and second position, $p_2$. The first vehicle 200 detects these dimensions by applying the sensors 202 of FIG. 2. Alternatively or in addition, the first vehicle 200 downloads some or all of these dimensions from the second vehicle 305 (assuming the second vehicle 305 is equipped for vehicle to vehicle communication).

Figure 5:
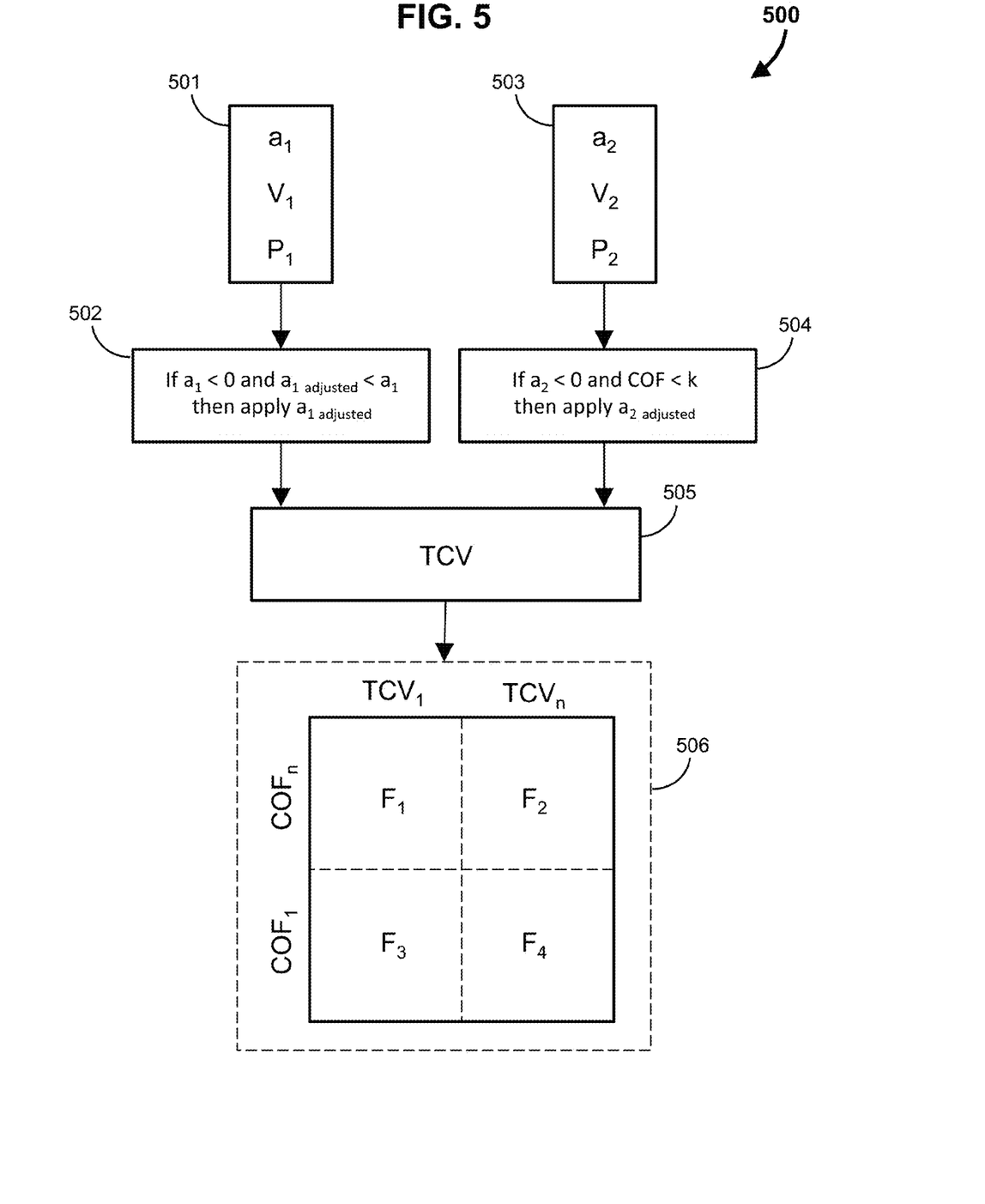
FIG. 5 is a block diagram of an example algorithm for application in the use-case of FIG. 3.

FIG. 5 shows an example algorithm 500 for application in the use case of FIG. 3. The algorithm 500 is designed to yield a theoretical collision velocity (TCV) between the first vehicle 200 and the second vehicle 305, then apply the TCV to prevent or mitigate the collision. More specifically, the algorithm applies the TCV to adjust a frequency of brake light flashing of the first vehicle 200 and/or a frequency/urgency of signal transmission from the first vehicle 200 to the second vehicle 305.

At 501 the first vehicle 200 finds the first acceleration, first velocity, and first position. At 503 the first vehicle 200 finds the second acceleration, second velocity, and second position. The first vehicle 200 uses these dimensions to find TCV at 505. In some embodiments, the first vehicle 200 adjusts the first acceleration at 502 and the acceleration at 504, then calculates TCV with reference to the adjusted accelerations.

Generally, steps 502 and 504 account for a worst-case scenario where the leading vehicle (e.g., the first vehicle 200) decelerates below the currently measured first acceleration and/or the trailing vehicle (e.g., the second vehicle 305) accelerates above the currently measured second acceleration. Steps 502 and 504 thus replace (for the purposes of TCV calculation at 505) $a_1$ with $a_{1\ adjusted}$ and/or $a_2$ with $a_{2\ adjusted}$, wherein $a_{1\ adjusted}$ is less than $a_1$ and $a_{2\ adjusted}$ is greater than $a_2$.

During step 502, the vehicle 200 determines whether $a_1$ is positive (accelerating), zero (coasting), or negative (braking). If $a_1$ is positive or zero, then the vehicle 200 takes no further action during step 502 and applies $a_1$ during step 505. If $a_1$ is negative, however, then the vehicle 200 substitutes $a_1$ with $a_{1\ adjusted}$ for the purposes of the TCV calculation at 505. More specifically, the vehicle 200 approximates the driver's intended level of deceleration. The driver's intended level of acceleration may be based on the degree of pressure that the driver has exerted on the brake pedal. If the driver's intended level of acceleration is lower than $a_1$ (the measured acceleration), then the algorithm 500 substitutes $a_1$ with $a_{1\ adjusted}$. The driver's intended level of acceleration will be lower than the current acceleration, $a_1$, when the vehicle is slipping and the driver is pressing the brake.

During step 504, the vehicle 200 determines whether $a_2$ is positive (accelerating), zero (coasting), or negative (braking). If $a_2$ is negative and a segment with a representative $\mu_k$ less than a predetermined constant, k (e.g., the oil slick 304) exists a predetermined distance or less ahead of the second vehicle 305, then the first vehicle 200 substitutes $a_2$ with $a_2$ adjusted for the purposes of the TCV calculation at 505. In various embodiments, $a_2$ adjusted is always less than or equal to zero and is a function of one or more of $a_2$ and the representative low $\mu_k$. In various embodiments, the predetermined distance is a function of $v_2$, such that at large $v_2$, the predetermined distance is large (thus encompassing more segments) and at a small $v_2$, the predetermined distance is small (thus encompassing fewer segments).

During step 505, the vehicle 200 calculates a theoretical collision velocity based on: $a_1$ or $a_{1\ adjusted}$, $v_1$, $p_1$, $a_2$ or $a_{2\ adjusted}$, $v_2$, and $p_2$. The theoretical collision velocity is the difference in velocity between the first vehicle 200 and the second vehicle 305 if the second vehicle 305 were to rear-end (i.e., collide with) the first vehicle 200. In other words, TCV=$v_{1\ at\ impact}$−$v_{2\ at\ impact}$. The kinetic energy of an object in motion depends on its mass and velocity. TCV is thus a good predictor for the magnitude of a hypothetical collision.

As stated above, TCV depends on $v_{1\ at\ impact}$−$v_{2\ at\ impact}$. The velocities at impact depend on the current velocities of the vehicles ($v_1$ and $v_2$), the accelerations of the vehicles ($a_1$ or $a_{1\ adjusted}$ and $a_2$ or $a_{2\ adjusted}$), and the time until impact/collision. The time until impact or collision is a function of $a_1$ or $a_{1\ adjusted}$, $v_1$, $p_1$, $a_2$ or $a_{2\ adjusted}$, $v_2$, and $p_2$. It should be appreciated that given the above variables, calculation of TCV is a straightforward application of kinematics equations.

After computing TCV, the vehicle 200 is configured to apply one or more functions (or generate one or more commands), F, based on one or more lookup tables 506. Each lookup table 506 relates one TCV (e.g., $TCV_1$) to one $\mu_k$ (e.g., $COF_1$). As stated above "COF" and "$\mu_k$" have the same meaning in this specification. Although the lookup table is shown as having two rows and two columns, it should be appreciated that the lookup table may include any number of rows and columns (e.g., fifty rows and fifty columns).

The TCV applied in the lookup table 506 is the closest TCV to the TCV calculated during step 505. The $\mu_k$ applied in the lookup table 506 is the $\mu_k$ compared with the predetermined constant, k, during step 504 and represents the lowest coefficient of kinetic friction within a predetermined distance (which is a function of $v_2$) ahead of the second vehicle 305. If no $\mu_k$ in the lookup table matches the $\mu_k$ applied during step 504, then the closest $\mu_k$ in the lookup table is selected.

Based on the selected TCV (e.g., $TCV_n$) and the selected $\mu_k$ (e.g., $COF_1$), the vehicle 200 selects a function (e.g., $F_4$). The function causes the vehicle to perform some act to deter the collision. As stated above, many lookup tables 506 may exist. One lookup table 506 may include functions related to a frequency of flashing brake lights (explained below). Another lookup table 506 may include functions related to a frequency or urgency of a signal broadcast from the first vehicle 200 to the second vehicle 305.

As stated above, the first vehicle 200 may be configured to preemptively flash its brake lights to alert the second vehicle 305 to slippery conditions and thereby deter a collision. In general, as the TCV increases (i.e., from $TCV_1$ to $TCV_n$), the frequency of brake light flashing increases (e.g., $F_2$ represents a greater frequency of brake light flashing than $F_1$). As the COF decreases (e.g., from $COF_n$ to $COF_1$), the frequency of brake light flashing increases (e.g., $F_3$ represents a greater frequency of brake light flashing than $F_1$). Intensity of power supplied to the brake lights (i.e., intensity of illumination of the brake lights) may be applied alternatively or in addition to frequency). Color of brake lights may be applied alternatively or in addition to frequency and intensity of power.

As stated above, alternatively or in addition to preemptive brake-light flashing, the vehicle 200 may be configured to apply a second lookup table 506 to adjust a frequency of broadcasts to the second vehicle 305. The broadcasts may include a stop or deceleration command. In general, as the TCV increases (e.g., from $TCV_1$ to $TCV_n$), the frequency of transmission increases (e.g., $F_2$ represents a greater frequency transmission than $F_1$). As the COF decreases (e.g., from $COF_n$ to $COF_1$), the frequency of transmission increases (e.g., $F_3$ represents a greater frequency of transmission than $F_1$).

The first vehicle 200 may apply a similar lookup table 506 to adjust a priority associated with the signal transmission (e.g., $F_4$ indicates a high priority whereas $F_1$ indicates a low priority). The first vehicle may apply a similar lookup table 506 to vary the frequency that the algorithm of FIG. 5 cycles (e.g., the algorithm of FIG. 5 cycles or repeats at a low frequency when $F_1$ is selected, but at a high frequency with $F_4$ is selected).

The invention claimed is:

1. A first vehicle comprising:
   sensors; and
   processor(s) configured to:
   determine, via the sensors: frictions of a road at which the first vehicle traversed; and a trailing vehicle's location and acceleration;
   calculate an adjusted trailing vehicle's acceleration when the second vehicle is at a predetermined distance from a portion of the road with a predetermined friction;
   compute a theoretical collision velocity (TCV) based on the adjusted trailing vehicle's acceleration;
   generate a command based on the TCV and a selected coefficient of kinetic friction (COF); and
   wherein the generated command automatically causes the first vehicle to preemptively flash brake lights at a frequency associated with the generated command.

2. The first vehicle of claim 1, wherein the processor(s) are configured to:
   select the COF from a stored group of COFs.

3. The first vehicle of claim 2, wherein the processor(s) are configured to: build the group of COFs from COFs of road existing between the first vehicle and the trailing vehicle.

4. The first vehicle of claim 1, wherein the processor(s) are configured to:
   determine the first vehicle's acceleration;
   assign a first adjusted acceleration to the first vehicle; and
   compute the TCV based on the first adjusted acceleration.

5. The first vehicle of claim 4, wherein the processor(s) are configured to:
   assign the first adjusted acceleration to the first vehicle only when the first vehicle's acceleration is less than zero.

6. The first vehicle of claim 4, wherein the processor(s) are configured to:
   assign the first adjusted acceleration to the first vehicle based on determining that the first vehicle's acceleration is less than zero.

7. The first vehicle of claim 4, wherein the processor(s) are configured to:
   assign the first adjusted acceleration to the first vehicle only when the first adjusted acceleration is less than the first vehicle's acceleration.

8. The first vehicle of claim 1, wherein the processor(s) are configured to:
   assign the adjusted trailing vehicle's acceleration to the trailing vehicle only when the trailing vehicle's acceleration is less than zero.

9. The first vehicle of claim 1, wherein the processor(s) are configured to:
   assign the adjusted trailing vehicle's acceleration to the trailing vehicle based on determining that the trailing vehicle's acceleration is less than zero.

10. The first vehicle of claim 1, wherein the processor(s) are configured to:
    assign the adjusted trailing vehicle's acceleration to the trailing vehicle only when the adjusted trailing vehicle's acceleration is greater than the second trailing vehicle's acceleration.

11. The first vehicle of claim 1, wherein the generated command automatically causes the first vehicle to transmit an inter-vehicle communication at the frequency associated with the generated command.

12. A vehicle comprising:
    sensors; and processor(s) configured to:
    determine, frictions of a road at which the vehicle traversed; and a trailing vehicle's acceleration;
    calculate an adjusted trailing vehicle's acceleration when the trailing vehicle is approaching a portion of the road with a predetermined friction;
    compute a theoretical collision velocity (TCV) based on the adjusted trailing vehicle's acceleration; and
    flash brake lights at a frequency based on the TCV and a selected coefficient of kinetic friction.

13. The vehicle of claim 12, wherein the processor(s) are configured to:
    determine, via the sensors, the vehicle's acceleration;
    assign a first adjusted acceleration to the vehicle; and
    compute the TCV based on the first adjusted acceleration.

14. The vehicle of claim 13, wherein the processor(s) are configured to:
    assign the first adjusted acceleration to the vehicle only when the vehicle's acceleration is less than zero.

15. The vehicle of claim 13, wherein the processor(s) are configured to:
    assign the first adjusted acceleration to the vehicle based on determining that the vehicle's acceleration is less than zero.

16. A method of controlling a first vehicle comprising:
    determining, via sensors and processor(s): frictions of a road at which the first vehicle traversed; a trailing vehicle's location and acceleration;
    calculating, via the processor(s), an adjusted trailing vehicle's acceleration when the trailing vehicle is at a predetermined distance from a portion of the road with a predetermined friction;
    computing, via the processor(s) a theoretical collision velocity (TCV) based on the adjusted trailing vehicle's acceleration;

generating, via the processor(s), a command based on the TCV and a selected coefficient of kinetic friction (COF); and wherein the generated command automatically causes the first vehicle to preemptively flash brake lights at a frequency associated with the generated command.

17. The method of claim 16, further comprising:

assigning, via the processor(s), the adjusted trailing vehicle's acceleration to the trailing vehicle only when the trailing vehicle's acceleration is less than zero.

* * * * *